UNITED STATES PATENT OFFICE.

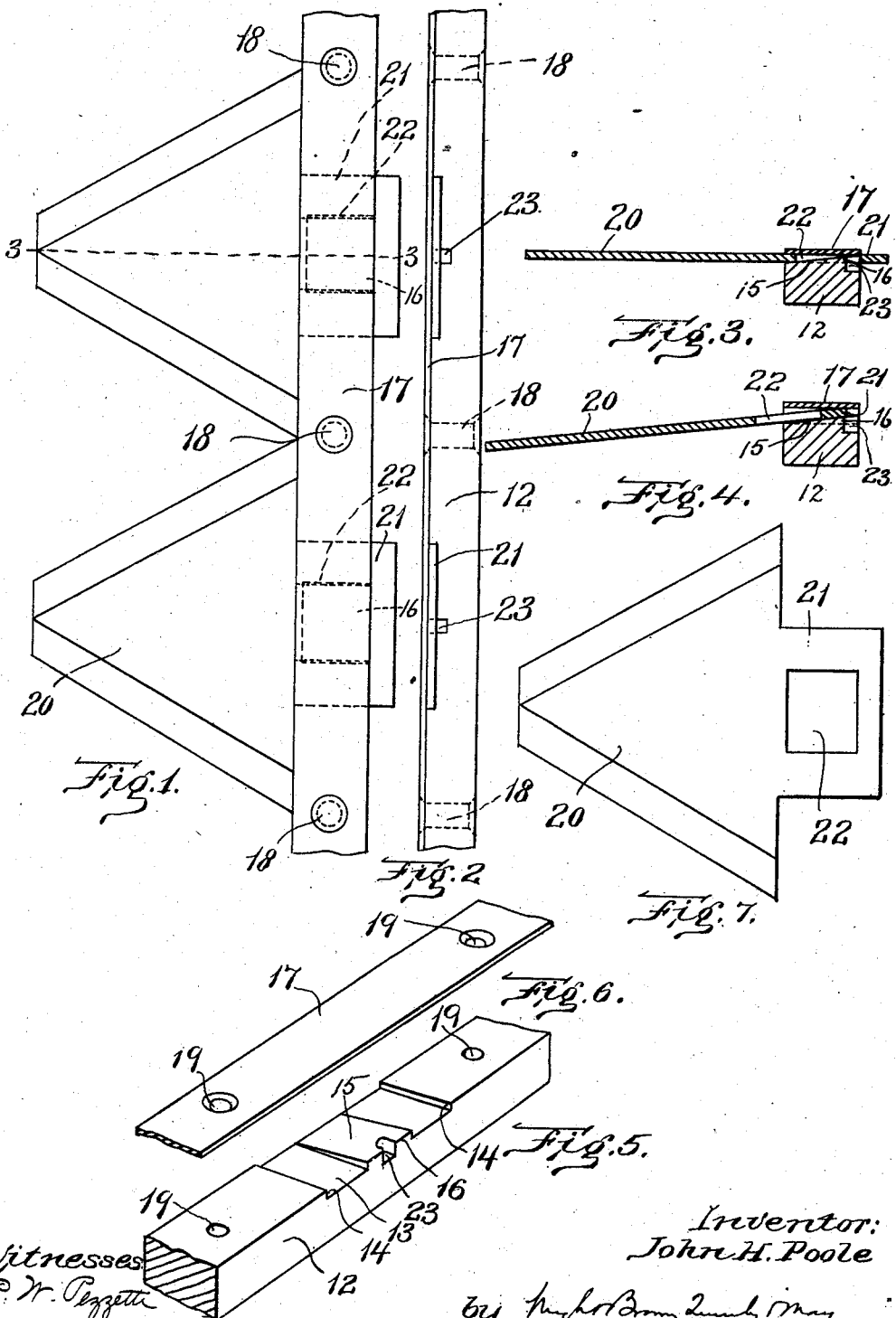

JOHN H. POOLE, OF BROCKTON, MASSACHUSETTS, ASSIGNOR TO BROCKTON MOWING MACHINE CUTTER BAR COMPANY, A CORPORATION OF MASSACHUSETTS.

CUTTER-BAR FOR MOWING-MACHINES, &c.

994,478. Specification of Letters Patent. Patented June 6, 1911.

Application filed July 19, 1910. Serial No. 572,672.

*To all whom it may concern:*

Be it known that I, JOHN H. POOLE, of Brockton, in the county of Plymouth and State of Massachusetts, have invented certain new and useful Improvements in Cutter-Bars for Mowing-Machines, &c., of which the following is a specification.

This invention relates to a reciprocating cutter bar having a series of substantially triangular knives and adapted for use in a mowing machine.

The invention has for its object to provide an improved construction of cutter bar and of cutters therefor whereby the cutters are adapted to be rigidly applied to and independently removed from the cutter bar without the employment of removable fastening devices such as screws or rivets engaging the cutters.

The invention consists in the improved construction which I will now proceed to describe and claim.

Of the accompanying drawings which form a part of this specification, Figure 1 represents a top plan view of a portion of a cutter bar and a series of cutters engaged therewith embodying my invention. Fig. 2 represents the rear edge of the portion of the cutter bar shown by Fig. 1. Fig. 3 represents a section on line 3—3 of Fig. 1. Fig. 4 represents a view similar to Fig. 3 illustrating the operation of applying a cutter to the cutter bar. Figs. 5 and 6 represent perspective views of detached parts of the cutter bar. Fig. 7 represents a side view of one of the cutters.

Similar reference characters refer to the same or similar parts in all the figures.

In the drawings, 12 represents the body portion of my improved cutter bar which is practically rigid and is provided in its upper side with a series of depressions each having a bottom wall or face 13 and two end walls or faces 14, extending across the said body portion. On the bottom 13 of the depression is formed a detent which is preferably integral with the body portion 12 and has an elongated beveled face 15 and a vertical face 16 which is preferably flush with the rear edge of the body portion 12. The height of the detent at the intersection of the faces 15 and 16 is preferably equal to the depth of the depression, or in other words, the height of the end walls 14 of the depression. The beveled face 15 is so formed that at the forward edge of the body portion 12 it merges into the bottom 13 of the depression.

The bottom 13 and ends 14 of each depression constitute three sides of a cutter shank-receiving socket which is completed by a springy plate 17 forming the fourth side of said socket. The distance between the highest part of the detent and the spring plate when the latter is in its normal position, is less than the thickness of the cutter shank hereinafter described. The plate 17 is preferably of tempered steel and is so thin that it is adapted to spring outwardly from the bottom 13 of the depression, the plate 17 being formed to cover the depression and extend across the detent therein. The plate 17 is preferably of substantially the same length as the body portion 12 and is permanently connected therewith at suitable intervals by fastening devices such as rivets 18 inserted in coinciding holes 19 formed for their reception on the body portion 12 and plate 17. Said rivets alternate with the above-described socket so that the plate 17 is attached to the body portion 12 at opposite ends of each socket as indicated by Fig. 1.

Each of the cutters 20 with which the cutter bar is equipped is composed of a body portion having the usual substantially triangular form, and a shank 21 adapted to enter one of the above-described sockets in the cutter bar, said shank being provided with a slot 22. The distance between the front and rear edges of said slot is preferably substantially equal to the distance between the rear face 16 of the detent and the front end of the beveled face 15, the slot being so formed that when the shank 21 is in place in the socket the slot will receive the detent, as indicated by Fig. 3.

The cutter is engaged with the cutter bar by inserting the shank 21 in the forward end of the socket and pressing the shank rearwardly. The rear end of the shank at first slides upwardly along the beveled face 15 of the detent, as indicated by Fig. 4, the plate 17 being displaced by the shank until the rear end of the slot 22 in the shank reaches the vertical face 16 of the detent. The elasticity of the displaced portion of the plate 17 causes it to then press the shank downwardly into engagement with the detent face 16, as indicated by Fig. 3. The cutter is now firmly engaged with the cutter bar and cannot be disengaged until pressure in two directions is exerted on the cutter, viz., an upward pressure on the rear end of the shank tending to lift the portion of the plate 17 above it, and a forward pressure tending to force the cutter forward from the face 16 of the detent. It will be seen that this combination of pressures cannot be accidentally exerted, so that there is no liability of the accidental disengagement of the cutters from the cutter bar, it being necessary to employ a suitable tool to pry the rear end of the shank 21 upwardly from the position shown by Fig. 3, and to apply forward pressure to the shank while it is raised above the detent face 16. To enable such tool to be conveniently used I provide a recess 23 in the body portion 12, said recess extending into the detent formed by the faces 15 and 16 as clearly shown by Fig. 5. The recess is adapted to receive either a special tool which may be provided, or any elongated object such as a wire nail, adapted to enter the said recess.

It will be seen that the plate 17 not only forms a side of the shank-receiving socket in the cutter bar, but also yieldingly holds the shanks of the cutters in engagement with detents formed within the shank-receiving sockets, the plate 17 therefore performing two functions. The body portion 12 and springy plate 17 formed as described constitute an expansible, normally contracted, shank-receiving socket.

I claim—

1. A cutter bar comprising a rigid body portion having a transverse depression in one side and a detent between the ends of said depression, the bottom and ends of the depression forming walls of a shank-receiving socket, and a spring plate extending across said depression and attached to the body portion at opposite ends of the depression, said plate completing the shank-receiving socket and being adapted to yieldingly hold a cutter shank in engagement with said detent, the distance between the detent and the spring plate being less than the thickness of the cutter shank.

2. A cutter bar comprising a rigid body portion having a transverse depression in one side and a detent between the ends of said depression, the bottom and ends of the depression forming walls of a shank-receiving socket, and a spring plate extending across said depression and attached to the body portion at opposite ends of the depression, said plate completing the shank-receiving socket and being adapted to yieldingly hold a cutter shank in engagement with said detent, the detent having a beveled face adapted to force the cutter shank outwardly against said plate and thereby displace the latter when the shank is being inserted in the socket, the distance between the detent and the spring plate being less than the thickness of the cutter shank.

3. In combination, a cutter bar having an expansible, normally contracted, shank-receiving socket provided with a shank-engaging detent having a beveled face, and a cutter having a shank formed to enter said socket and provided with a slot formed to receive said detent, said socket constituting the main support for said shank, the beveled face of the detent causing the expansion of the socket while the shank is being inserted, and the contraction of the socket yieldingly holding the shank in engagement with the detent when the shank is fully inserted, the distance between the detent and the spring plate being less than the thickness of the cutter shank.

4. A cutter bar comprising a relatively rigid body portion having a series of transverse depressions in one side and a series of rigid detents between the ends of said depressions, the bottom and ends of each depression forming walls of a shank-receiving socket, and a spring plate extending across said depressions and rigidly attached to the body portion between the depressions, said plate completing the shank-receiving sockets and being adapted to yieldingly hold the cutter shanks independently in engagement with said detents, the distance between the detent and the spring plate of each socket being less than the thickness of a cutter shank.

5. A cutter bar comprising a relatively rigid body portion having a series of transverse depressions in one side and a series of rigid detents between the ends of said depressions, the bottom and ends of the depressions forming walls of shank-receiving sockets, and a spring plate extending across said depressions and rigidly attached to the body portion between the depressions, said plate completing the shank-receiving sockets and being adapted to yieldingly hold the cutter shanks independently in engagement with said detents, each detent having a beveled face adapted to force a cutter shank outwardly against said plate and thereby locally displace the latter when the shank is being inserted in its socket, the distance between the detent and the spring plate of each socket being less than the thickness of a cutter shank.

6. In combination, a cutter bar having a series of independent transverse sockets each independently expansible and each normally contracted independently, each socket being provided with a rigid shank-engaging detent having a beveled face, and a series of cutters each having a shank formed to enter one of said sockets and provided with a slot formed to receive the detent thereof, the beveled face of the detent causing the expansion of the socket by the shank while the latter is being inserted, and the contraction of the socket yieldingly holding the shank independently in engagement with the rigid detent of its socket when the shank is fully inserted, the distance between the detent and the spring plate of each socket being less than the thickness of a cutter shank.

In testimony whereof I have affixed my signature, in presence of two witnesses.

JOHN H. POOLE.

Witnesses:
C. F. BROWN,
E. BATCHELDER.

Copies of this patent may be obtained for five cents each, by addressing the "Commissioner of Patents, Washington, D. C."